US009465570B2

(12) United States Patent
Mitsuhashi et al.

(10) Patent No.: US 9,465,570 B2
(45) Date of Patent: Oct. 11, 2016

(54) INFORMATION PROCESSING APPARATUS AND INFORMATION PROCESSING SYSTEM

(71) Applicant: FUJI XEROX CO., LTD., Tokyo (JP)

(72) Inventors: Tomoyuki Mitsuhashi, Kanagawa (JP); Yuichi Nishikuni, Kanagawa (JP); Masaru Okutsu, Kanagawa (JP); Daigo Hama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/611,383

(22) Filed: Feb. 2, 2015

(65) Prior Publication Data

US 2016/0026902 A1 Jan. 28, 2016

(30) Foreign Application Priority Data

Jul. 22, 2014 (JP) ................................ 2014-149129

(51) Int. Cl.

| | |
|---|---|
| ***H04N 1/60*** | (2006.01) |
| ***G03F 3/08*** | (2006.01) |
| ***H04N 1/46*** | (2006.01) |
| ***G06F 3/12*** | (2006.01) |
| ***H04N 1/00*** | (2006.01) |

(52) U.S. Cl.

CPC .............. *G06F 3/1285* (2013.01); *H04N 1/00* (2013.01)

(58) Field of Classification Search

None

See application file for complete search history.

(56) References Cited

U.S. PATENT DOCUMENTS

| | | | | | |
|---|---|---|---|---|---|
| 5,032,903 | A * | 7/1991 | Suzuki | H04N 1/00352 | 358/448 |
| 5,101,283 | A * | 3/1992 | Seki | H04N 1/00411 | 358/3.03 |
| 5,333,243 | A * | 7/1994 | Best | H04N 1/52 | 345/589 |
| 5,510,910 | A * | 4/1996 | Bockman | H04N 1/52 | 358/502 |
| 6,115,495 | A * | 9/2000 | Tachikawa | G06K 9/00463 | 382/165 |

(Continued)

FOREIGN PATENT DOCUMENTS

| | | |
|---|---|---|
| JP | 2006-262480 A | 9/2006 |
| JP | 2011-176463 A | 9/2011 |

*Primary Examiner* — Madelein Nguyen

(74) *Attorney, Agent, or Firm* — Sughrue Mion, PLLC

(57) ABSTRACT

An information processing apparatus includes a first acquiring unit, an identifying unit, and a transmitting unit. The first acquiring unit acquires image data including color values each of which denotes a corresponding one of multiple pixels in one or multiple pages. The identifying unit identifies, from the color values, color regions to which pixels constituting at least part of the multiple pixels belong in a predetermined color model. The transmitting unit transmits the number of pages in which the color regions identified by the identifying unit correspond to a predetermined color region combination.

8 Claims, 6 Drawing Sheets

(56) References Cited

U.S. PATENT DOCUMENTS 6,519,050 B1* 2/2003 Eintracht ................. H04N 1/62 358/1.15
8,988,735 B2* 3/2015 Nakashima .............. H04N 1/58 358/1.9
2001/0052998 A1* 12/2001 Kiyosu .................. G06K 15/00 358/1.15
2002/0109855 A1* 8/2002 Matsuya .................. H04N 1/56 358/1.9
2003/0098983 A1* 5/2003 Terada ...................... G06T 9/00 358/1.2
2003/0151756 A1* 8/2003 Yamazaki .............. B41J 2/2107 358/1.9
2004/0156544 A1* 8/2004 Kajihara .............. G06K 9/4652 382/167
2004/0184057 A1* 9/2004 Nakabayshi .............. G06T 1/60 358/1.9
2004/0190019 A1* 9/2004 Li ........................ H04N 1/6033 358/1.9
2005/0174586 A1* 8/2005 Yoshida ............... H04N 1/6019 358/1.9
2005/0201620 A1* 9/2005 Kanamoto ........... G06K 9/2018 382/182
2006/0250628 A1* 11/2006 Owen ................... G06F 3/1208 358/1.13
2008/0130053 A1* 6/2008 Okamoto .............. G06F 3/0317 358/1.17
2008/0187214 A1* 8/2008 Shoda .................... H04N 1/486 382/162
2008/0231921 A1* 9/2008 Dokuni .................... H04N 1/56 358/520
2008/0232686 A1* 9/2008 Ohashi ................ G06F 17/3025 382/168
2009/0180164 A1* 7/2009 Miyagi .............. H04N 1/40012 358/518
2009/0249200 A1* 10/2009 Hasegawa .......... H04N 1/32117 715/273
2010/0165367 A1* 7/2010 Nomura ............. G03G 15/5062 358/1.9
2010/0194776 A1* 8/2010 Chong ................... G06Q 30/06 345/594
2011/0085697 A1* 4/2011 Clippard .............. G06K 9/4652 382/100
2011/0194162 A1* 8/2011 Nakaso .................... H04N 1/52 358/518
2013/0016405 A1* 1/2013 Tsutsumi ........... H04N 1/32128 358/403
2013/0050248 A1* 2/2013 Nose .................... G09G 3/2003 345/596
2013/0094038 A1* 4/2013 Okamoto ........... H04N 1/00307 358/1.9
2013/0135633 A1* 5/2013 Tamura .................... H04N 1/60 358/1.9
2013/0148139 A1* 6/2013 Matsuhira ................ H04N 1/41 358/1.9
2013/0272606 A1* 10/2013 Nakamura ........... G06K 9/4652 382/167
2014/0010459 A1* 1/2014 Sumi ........................ G06K 9/46 382/195
2014/0104658 A1* 4/2014 Ishizuka ............ G03G 15/5058 358/3.24
2014/0285477 A1* 9/2014 Cho ..................... G09G 3/2003 345/207
2014/0307007 A1* 10/2014 Cho ..................... G09G 3/3406 345/690
2015/0130808 A1* 5/2015 Takagi ..................... G09G 5/06 345/428
2015/0193426 A1* 7/2015 Liu ..................... G06F 17/2705 704/9
2015/0268098 A1* 9/2015 Minchew ................ G01J 3/528 345/594

* cited by examiner

FIG. 7

| NUMBER | RGB VALUE | APPEARANCE FREQUENCY |
|---|---|---|
| 1 | (0, 0, 255) | 510 |
| 2 | (10, 10, 255) | 420 |
| 3 | (100, 100, 100) | 200 |
| ••• | ••• | ••• |
| N | (22, 60, 235) | 100 |
| ••• | ••• | ••• |

FIG. 8

| NUMBER | HUE | SATURATION | VALUE | APPEARANCE FREQUENCY | COLOR REGION |
|---|---|---|---|---|---|
| 1 | 240 | 100 | 100 | 510 | BLUE |
| 2 | 240 | 96 | 100 | 420 | BLUE |
| 3 | 0 | 0 | 39 | 200 | GRAY |
| ••• | ••• | ••• | ••• | ••• | ••• |
| N | 229 | 90 | 92 | 100 | RED |
| ••• | ••• | ••• | ••• | ••• | ••• |

FIG. 9

| COLOR-REGION COMBINATION | THE NUMBER OF PAGES |
|---|---|
| BLUE AND GRAY | 10 |
| GREEN AND GRAY | 20 |
| RED AND GRAY | 300 |

| PRINTING MODE | THE NUMBER OF PAGES |
| --- | --- |
| FULL-COLOR PRINTING | 500 |
| TWO-COLOR PRINTING | 20 |
| BLACK-AND-WHITE PRINTING | 750 |

INFORMATION PROCESSING APPARATUS AND INFORMATION PROCESSING SYSTEM

CROSS-REFERENCE TO RELATED APPLICATIONS

This application is based on and claims priority under 35 USC 119 from Japanese Patent Application No. 2014-149129 filed Jul. 22, 2014.

BACKGROUND (i) Technical Field

The present invention relates to an information processing apparatus and an information processing system.

(ii) Related Art

It is known that information processing apparatuses perform processing of multiple colors included in image data on the basis of their appearance frequency.

SUMMARY

According to an aspect of the invention, there is provided an information processing apparatus including a first acquiring unit, an identifying unit, and a transmitting unit. The first acquiring unit acquires image data including color values each of which denotes a corresponding one of multiple pixels in one or multiple pages. The identifying unit identifies, from the color values, color regions to which pixels constituting at least part of the multiple pixels belong in a predetermined color model. The transmitting unit transmits the number of pages in which the color regions identified by the identifying unit correspond to a predetermined color region combination.

BRIEF DESCRIPTION OF THE DRAWINGS

An exemplary embodiment of the present invention will be described in detail based on the following figures, wherein:

FIG. 7 is a diagram illustrating information regarding appearance frequencies of colors in a specific page;

FIG. 8 is a diagram illustrating a list of hue-saturation-value of (HSV) values in the specific page;

FIG. 9 is a diagram illustrating an example in which the number of pages is recorded on a per color-region combination basis;

DETAILED DESCRIPTION

Figure 1:
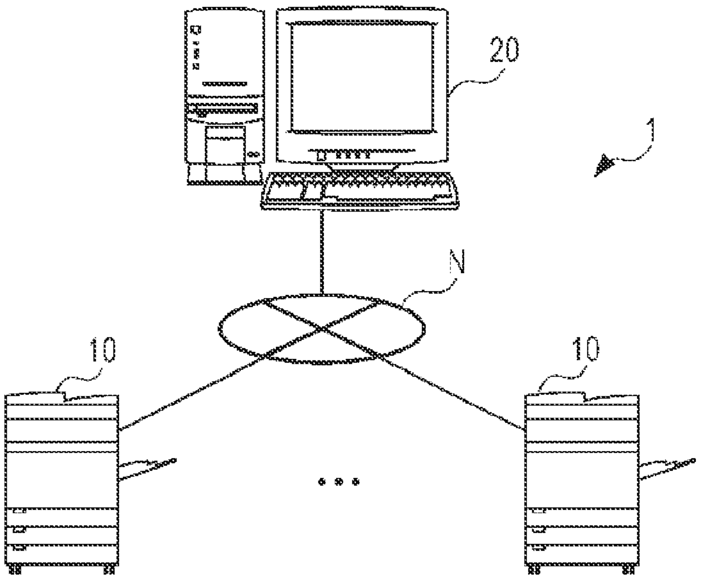
FIG. 1 is a diagram illustrating an overall configuration of an information processing system.

FIG. 1 is a diagram illustrating an overall configuration of an information processing system 1 according to an exemplary embodiment of the invention. The information processing system 1 is a system for managing the number of pages printed by image forming apparatuses 10 and the color characteristics of each page and for adjusting the balance between printing quality and cost. The information processing system 1 includes the image forming apparatuses 10 (an example of a first information processing apparatus) and a server apparatus 20 (an example of a second information processing apparatus). Each image forming apparatus 10 is an apparatus that functions as a copier, a printer, a scanner, or a facsimile machine. The image forming apparatus 10 is connected to an external device (not shown) such as a personal computer through a communication network. The server apparatus 20 is an apparatus that manages the information processing system 1. The server apparatus 20 manages the number of pages printed by the multiple image forming apparatuses 10 and the color characteristics of each page. The multiple image forming apparatuses 10 and the server apparatus 20 are connected to each other through a communication network N such as the Internet.

Figure 2:
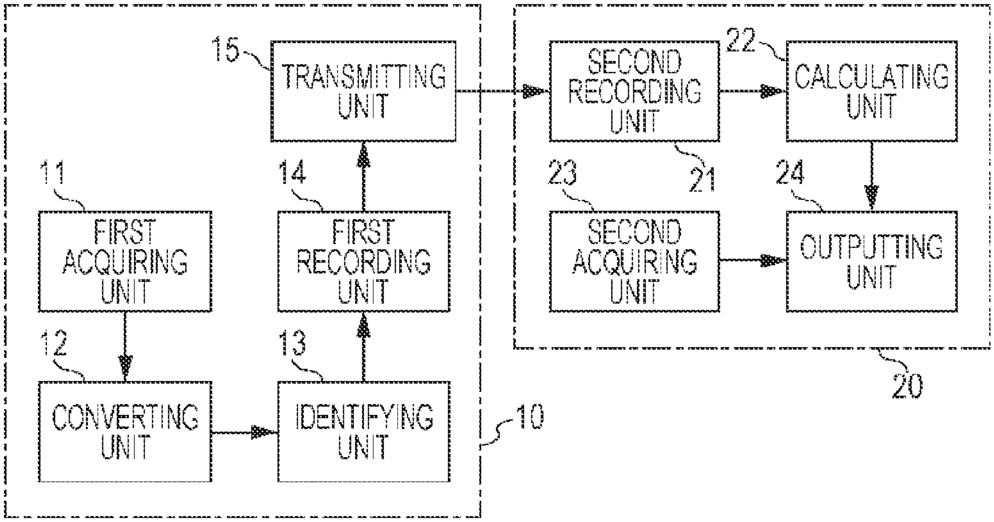
FIG. 2 is a block diagram illustrating a functional configuration of the information processing system.

FIG. 2 is a block diagram illustrating a functional configuration of the information processing system 1. Each image forming apparatus 10 includes a first acquiring unit 11, a converting unit 12, an identifying unit 13, a first recording unit 14, and a transmitting unit 15. The first acquiring unit 11 acquires image data including color values of respective multiple pixels of one or multiple pages. The color values included in the image data acquired by the first acquiring unit 11 are color values in a color model (for example, an RGB color model) that does not use hue. The converting unit 12 converts color values of pixels constituting at least part of the multiple pixels into values of a hue-based color model. The identifying unit 13 identifies color regions to which pixels constituting at least part of the multiple pixels belong in the hue-based color model. Note that the term “color regions” refers to multiple regions in the hue-based color model divided on the basis of values of components of the hue-based color model.

Figure 3:
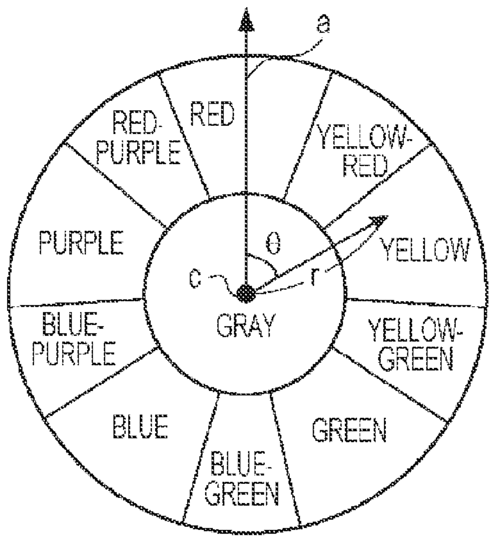
FIG. 3 is a diagram for explaining color regions.

FIG. 3 is a diagram for explaining the color regions. FIG. 3 illustrates an example of defining color regions in an HSV color model (a color model composed of hue, saturation, and value) taken as an example of the hue-based color model. FIG. 3 illustrates a plane having the same value in the HSV color model. The HSV color model illustrated in FIG. 3 uses a polar coordinate system having a center c of a circle as the origin. Saturation is represented by using a distance r from the origin, and hue is represented by using an angle of deviation θ from a reference axis a. A relatively low saturation region (region close to the center of the circle) is assigned a gray color region. In a relatively high saturation region, color regions are defined on a hue basis. In this example, color regions of red, yellow-red, yellow, yellow-green, green, blue-green, blue, blue-purple, purple, and red-purple are arranged clockwise in this order.

Referring back to FIG. 2, the first recording unit 14 records the number of pages in which color regions identified by the identifying unit 13 correspond to a predetermined color-region combination. The transmitting unit 15 transmits to the server apparatus 20 the number of pages recorded by the first recording unit 14.

The server apparatus 20 includes a second recording unit 21, a calculating unit 22, a second acquiring unit 23, and an outputting unit 24. The second recording unit 21 records the number of pages transmitted by the image forming apparatus 10. The calculating unit 22 calculates the number of pages corresponding to at least one of multiple printing modes in which the number of used colors is different for each mode, by using the number of pages recorded by the second recording unit 21. The second acquiring unit 23 acquires the number of pages printed in each of the multiple printing modes. The outputting unit 24 outputs information including a result of comparing the number of pages calculated by the calculating unit 22 with the number of pages acquired by the second acquiring unit 23.

Figure 4:
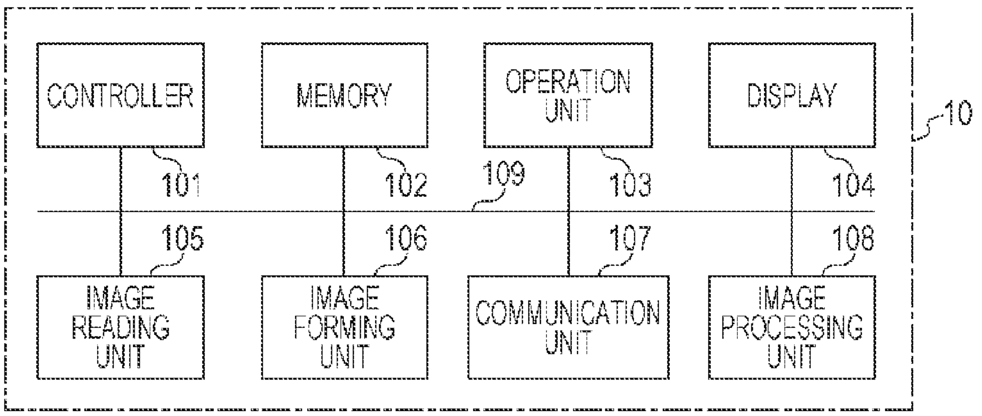
FIG. 4 is a block diagram illustrating a hardware configuration of an image forming apparatus.

FIG. 4 is a block diagram illustrating a hardware configuration of each image forming apparatus 10. As illustrated in FIG. 4, the image forming apparatus 10 includes a controller 101, a memory 102, an operation unit 103, a display 104, an image reading unit 105, an image forming unit 106, a communication unit 107, and an image processing unit 108. The components of the image forming apparatus 10 are connected to a bus 109 and exchange various data with each other through the bus 109.

The controller 101 controls operation of the components of the image forming apparatus 10. The controller 101 includes an arithmetic processing unit such as a central processing unit (CPU) and storage media (main memory) such as a read only memory (ROM) and a random access memory (RAM). The CPU reads a program stored in the ROM or the memory 102, and executes the program by using the RAM as a work area. The controller 101 executes the program in this manner and thereby implements forming (printing) an image on a sheet, generating image data by reading the image from a document, communicating with other devices through a communication network, and the like.

The memory 102 stores data therein. The memory 102 includes storage media (auxiliary memory) such as a hard disk and a flash memory and stores therein data received by the communication unit 107, data generated by the image forming apparatus 10, and the like. The memory 102 may also include an attachable and detachable storage medium (removable medium) such as a so-called memory card or a universal serial bus (USB) memory, and a device that reads and writes data from and to the storage medium. The memory 102 stores a recording program (described later) therein.

The operation unit 103 receives a user operation. The operation unit 103 includes controls (such as buttons and keys) and supplies the controller 101 with a control signal corresponding to a pressed one of the controls. The operation unit 103 may also include a touch panel that includes a display 104 and a sensor stacked on a display surface of the display 104 and that supplies the controller 101 with a control signal corresponding to a position at which the user touches the touch panel.

The display 104 displays information. The display 104 has, for example, a liquid crystal display serving as a display device. The display 104 is controlled by the controller 101 to display a menu screen for operating the image forming apparatus 10.

The image reading unit 105 reads a document and converts a document image into image data. The image reading unit 105 has an image reader that optically reads a document and generates image data representing an image of the read document. The image reading unit 105 supplies the image processing unit 108 with the generated image data.

The image forming unit 106 forms an image on a sheet. The image forming unit 106 includes an image forming mechanism that forms a toner image by using an electrophotographic system. Note that the image forming mechanism is not limited to an electrophotographic system, but may use another recording system such as an inkjet system.

The communication unit 107 transmits and receives data. The communication unit 107 is connected to the communication network N and functions as a communication interface for communicating with the server apparatus 20 and the other image forming apparatus 10.

The image processing unit 108 performs image processing of image data. Image processing herein refers to, for example, color correction or tone correction. In a case where the image forming apparatus 10 implements a printing function, the image processing unit 108 supplies the image forming unit 106 with the image data that has undergone image processing.

In FIG. 4, the communication unit 107 and the image reading unit 105 that are controlled by the controller 101 executing the recording program for recording the color characteristics of each page are examples of the first acquiring unit 11. The controller 101 executing the recording program is an example of the converting unit 12, the identifying unit 13, and the first recording unit 14. The communication unit 107 controlled by the controller 101 executing the recording program is an example of the transmitting unit 15.

Figure 5:
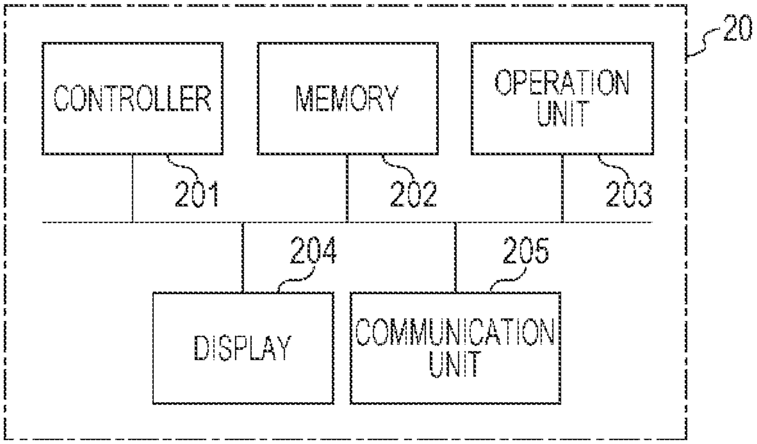
FIG. 5 is a block diagram illustrating a hardware configuration of a server apparatus.

FIG. 5 is a block diagram illustrating a hardware configuration of the server apparatus 20. As illustrated in FIG. 5, the server apparatus 20 includes a controller 201, a memory 202, an operation unit 203, a display 204, and a communication unit 205. The components of the server apparatus 20 are connected to a bus 206 and exchange various data with each other through the bus 206.

The controller 201 controls operation of the components of the server apparatus 20. The controller 201 includes an arithmetic processing unit such as a CPU and storage media (main memory) such as a ROM and a RAM. The memory 202 stores data therein. The memory 202 includes storage media (auxiliary memory) such as a hard disk and a flash memory, and stores therein data received by the communication unit 205. The memory 202 stores a management program (described later) therein. The operation unit 203 receives a user operation.

The operation unit 203 includes controls (such as a keyboard and a mouse) and supplies the controller 201 with a control signal corresponding to a pressed one of the controls. The display 204 displays information. The display 204 has, for example, a liquid crystal display serving as a display device. The communication unit 205 transmits and receives data. The communication unit 205 is connected to the communication network N and functions as a communication interface for communicating with the image forming apparatuses 10.

In FIG. 5, the controller 201 executing the management program for managing the color characteristics of each page printed by each image forming apparatus 10 is an example of the second recording unit 21 and the calculating unit 22. The communication unit 205 controlled by the controller 201 executing the management program is an example of the second acquiring unit 23. The display 204 controlled by the controller 201 executing the management program is an example of the outputting unit 24.

Figure 6:
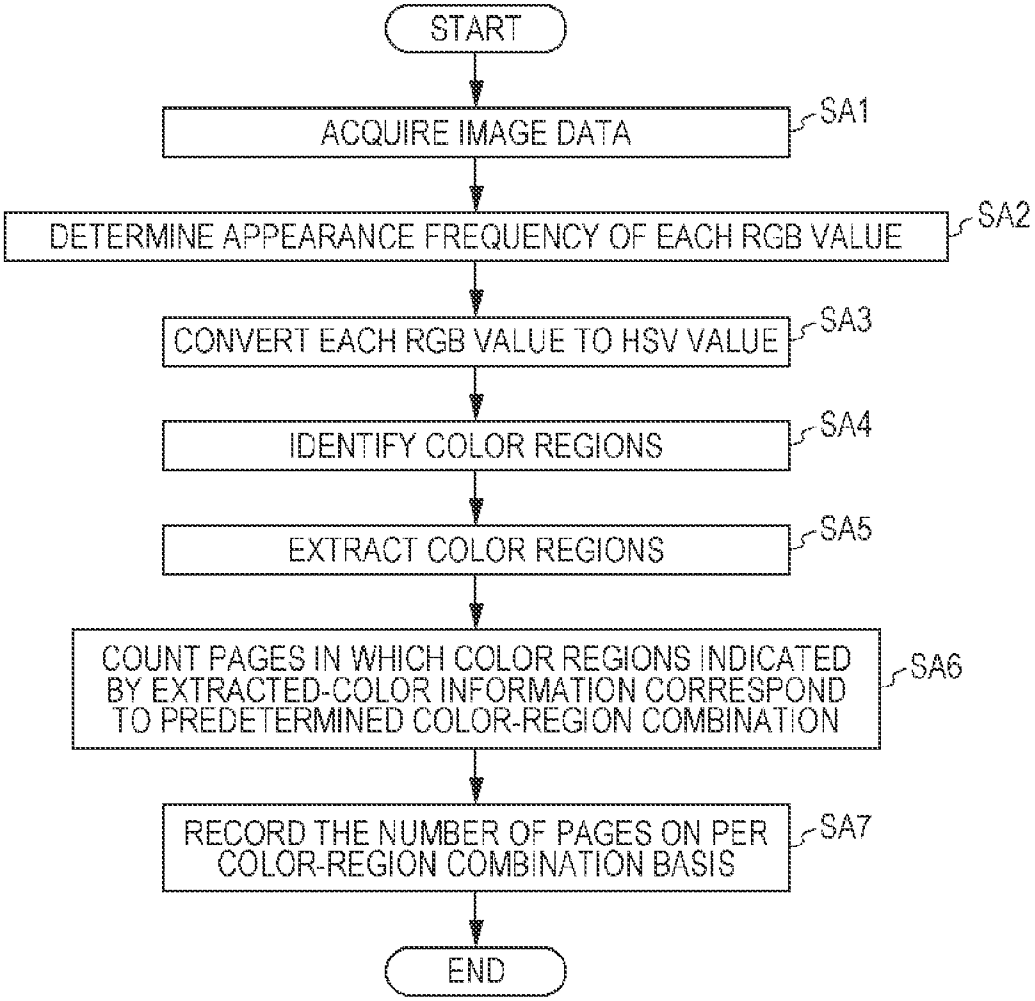
FIG. 6 is a flowchart illustrating processing performed by the image forming apparatus.

FIG. 6 is a flowchart illustrating processing in which each image forming apparatus 10 records the color characteristics of pages on which printing has been performed. The processing described below is initiated by inputting an instruction for causing the image forming apparatus 10 to perform printing (instruction issued for using a copying function, a printing function, or another function). The instruction issued for using the copying function (hereinafter, referred to as a "copying instruction") is inputted in the following manner, for example. The user places a document at a predetermined position in the image reading unit 105 and operates the operation unit 103. The instruction issued for using the printing function (hereinafter, referred to as a "printing instruction") is inputted, for example, in such a manner that the user operates an operation unit of an external device connected to the image forming apparatus 10 through the communication network. Note that the image forming apparatus 10 performs printing processing separately from the processing illustrated in FIG. 6.

In step SA1, the controller 101 acquires image data of one or multiple pages. Specifically, in a case where a copying instruction is inputted, the controller 101 reads one or more images from a document and generates image data. In a case where a printing instruction is inputted, the controller 101 acquires image data from the external device. The image data includes RGB values (an example of color values) of the respective multiple pixels. The controller 101 stores the acquired image data in the RAM.

In step SA2, the controller 101 determines the appearance frequency of each RGB value in the acquired image data. Specifically, the controller 101 determines the appearance frequency of each RGB value of the acquired image data, on a per page basis. The controller 101 stores information (hereinafter, referred to as "frequency information") indicating the appearance frequency of the RGB value, in the RAM on a per page basis.

FIG. 7 is a diagram illustrating the frequency information of a specific page. In the frequency information illustrated in FIG. 7, appearance frequencies are arranged in descending order, that is, from the RGB value having the highest appearance frequency. Three R, G, and B component values that constitute each RGB value represent the gradation level of red, green, and blue, respectively. In this case, the gradation level is expressed on a scale of 0 to 255 (256 levels). In FIG. 7, the specific page includes 510 pixels having an RGB value of (0, 0, 255), 420 pixels having an RGB value of (10, 10, 255), 200 pixels having an RGB value of (100, 100, 100), . . . , and 100 pixels having an RGB value of (22, 60, 235).

Referring back to FIG. 6, in step SA3, the controller 101 converts the RGB values included in the frequency information into HSV values according to the HSV color model. The controller 101 converts, for example, RGB values that each exhibit an appearance frequency equal to or higher than a predetermined threshold into HSV values. The controller 101 converts the RGB values into the HSV values by using a predetermined formula. The controller 101 stores a list of the converted HSV values (hereinafter, referred to as an "HSV value list") in the RAM on a per page basis.

FIG. 8 is a diagram illustrating an HSV value list for the foregoing specific page. FIG. 8 illustrates the HSV value list generated from the frequency information illustrated in FIG. 7. In this example, hue is represented by a range of 0 degrees to 360 degrees. Saturation and value are represented by a range of 0 to 100. FIG. 8 illustrates an HSV value of (240, 100, 100) converted from the RGB value of (0, 0, 255), an HSV value of (240, 96, 100) converted from the RGB value of (10, 10, 255), an HSV value of (0, 0, 39) converted from the RGB value of (100, 100, 100), . . . , and an HSV value of (229, 90, 92) converted from the RGB value of (22, 60, 235). Note that color regions will be described later.

Referring back to FIG. 6, in step SA4, the controller 101 identifies color regions corresponding to the respective HSV values in the HSV value list. The memory 102 has stored therein data defining correspondence between HSV values (values of hue, saturation, and value components) and color regions. The controller 101 refers to the data and thereby identifies the color regions. The controller 101 stores each identified color region in association with a corresponding one of the HSV values in the HSV value list.

Referring back to FIG. 8, color regions of the HSV values of (240, 100, 100) and (240, 96, 100) are identified as "blue", a color region of the HSV value of (0, 0, 39) is identified as "gray", and a color region of the HSV value of (229, 90, 92) is identified as "red".

Referring back to FIG. 6, in step SA5, the controller 101 extracts color regions each accounting for a higher percentage of the page than a predetermined percentage. Specifically, the controller 101 calculates a total sum of appearance frequencies of the HSV values on a per color-region basis. If the percentage of the total sum of the appearance frequencies of the color region relative to the total number of pixels of the page is higher than the predetermined percentage, the controller 101 extracts the color region. Note that information indicating the total number of pixels of the page is included in the image data. The controller 101 stores the information indicating the extracted color regions (hereinafter, referred to as "extracted-color information") in the RAM on a per page basis.

In step SA6, the controller 101 counts pages in which color regions indicated by the extracted-color information correspond to a predetermined color-region combination. The memory 102 has stored therein one or more color-region combinations. The controller 101 determines, for each page, whether the color regions indicated by the extracted-color information fall under any of the color-region combinations stored in the memory 102 and counts pages in which color regions indicated by the extracted-color information fall under any one of the color-region combinations, on a per color-region combination basis. For example, in a case where a combination of blue and gray has been stored in the memory 102 as a color-region combination, a page in which the color regions indicated by the extracted-color information are blue and gray is counted as a page in which color regions indicated by the extracted-color information fall under the color-region combination. In this example, assume other cases where color regions of a page indicated by the extracted-color information include a color region other than blue and gray (for example, a page having red, blue, and gray indicated by the extracted-color information) and where a color region of a page indicated by the extracted-color information is blue or gray. The color regions of the page in the former case and the color region of the page in the latter case do not fall under the color-region combination, and thus the pages are not counted. In step SA7, the controller 101 records, on a per color-region combination basis, the number of pages in which color regions indicated by the extracted-color information fall under any one of the color-region combinations stored in the memory 102.

FIG. 9 is a diagram illustrating an example in which the number of pages is recorded on a per color-region combination basis. Each color-region combination includes, for example, two color regions. FIG. 9 illustrates an example in which a combination of blue and gray, a combination of green and gray, and a combination of red and gray have been stored in the memory 102. In this example, the number of pages in which color regions fall under the combination of blue and gray is 10; the number of pages in which color regions fall under the combination of green and gray is 20; and the number of pages in which color regions fall under the combination of red and gray is 300. In a page in which color regions indicated by the extracted-color information correspond to any one of the predetermined color-region combinations, specific color regions tend to appear more frequently in the page than the other color regions. For such a page, the quality of an image of the sheet does not tend to be greatly influenced, even in a case where printing specific colors (printing using some colors with toner or ink of the image forming apparatus 10, such as two-color printing, hereinafter referred to as "specific-color printing") is performed, instead of full-color printing (printing using all colors of the image forming apparatus 10). Accordingly, in the case where the number of pages in which color regions indicated by the extracted-color information correspond to any one of the predetermined color-region combinations is stored in the image forming apparatus 10 on a per color-region combination basis, the tendency for the color regions of the image formed on the sheet to appear more frequently, as described above, is thereby determined on a per page basis. This tendency for the color regions is used, for example, to determine, from among multiple printing modes in which the number of used colors is different for each mode, a printing mode suitable for forming an image on a sheet.

Figures 10, 11:
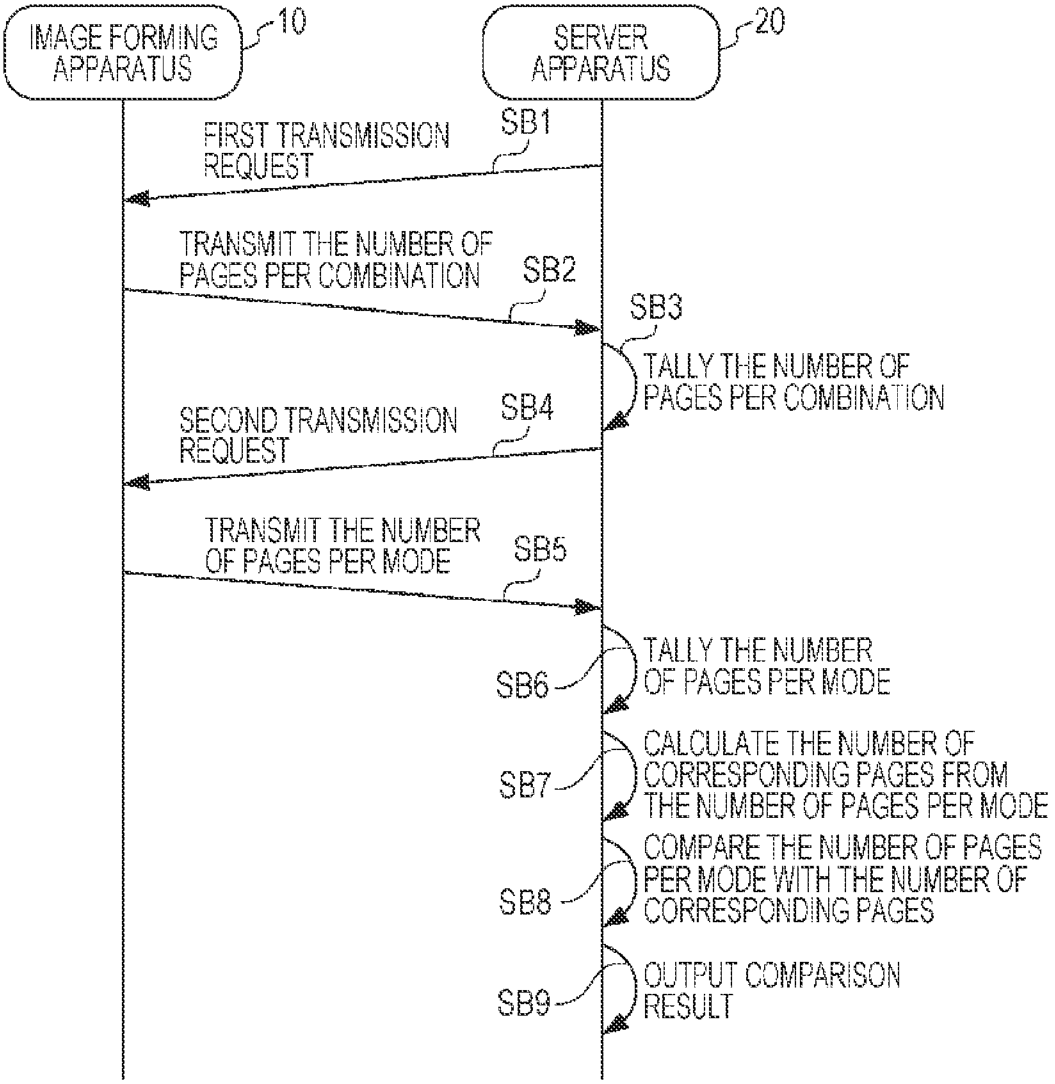
FIG. 10 is a sequence chart illustrating processing performed in the information processing system.
FIG. 11 is a diagram illustrating the number of pages tallied on a per mode basis.

FIG. 10 is a sequence chart illustrating processing performed in the information processing system 1. The following processing is performed for the server apparatus 20 to tally the number of pages recorded by the image forming apparatus 10 on a per color-region combination basis (hereinafter, referred to as "the number of pages per combination") and to output information obtained by using the tallied number of pages. Note that the following processing is performed by each image forming apparatus 10 and the server apparatus 20 in the information processing system 1.

In step SB1, the controller 201 of the server apparatus 20 transmits, to each image forming apparatus 10, a request (hereinafter, referred to as a "first transmission request") for causing the image forming apparatus 10 to transmit the number of pages per combination. The first transmission request is transmitted to the image forming apparatus 10, for example, at regular intervals. In step SB2, the controller 101 of the image forming apparatus 10 transmits the number of pages per combination stored in the memory 102 to the server apparatus 20. In step SB3, the controller 201 tallies the number of pages per combination obtained from each image forming apparatus 10. The controller 201 stores in the memory 202 the tallied number of pages per combination.

In step SB4, the controller 201 transmits, to each image forming apparatus 10, a request (hereinafter, referred to as a "second transmission request") for causing the image forming apparatus 10 to transmit the number of pages (hereinafter, referred to as "the number of pages per mode") that are printed in each of the multiple printing modes and that are categorized as a corresponding one of the printing modes. The second transmission request is transmitted to the image forming apparatus 10, for example, at regular intervals. In step SB5, the controller 101 transmits the number of pages per mode to the server apparatus 20. Specifically, the controller 101 stores the number of pages per mode in the memory 102 every time the image forming apparatus 10 performs printing. The controller 101 transmits the number of pages per mode stored in the memory 102 to the server apparatus 20. In step SB6, the controller 201 tallies the number of pages per mode obtained from each image forming apparatus 10. The controller 201 stores the tallied number of pages per mode in the memory 202.

FIG. 11 is a diagram illustrating the tallied number of pages per mode. In FIG. 11, the number of pages printed in each of a full-color printing mode, a two-color printing mode, and a black-and-white printing mode are tallied. In this example, the number of pages having undergone full-color printing is 500, the number of pages having undergone two-color printing is 20, and the number of pages having undergone black-and-white printing is 750.

In step SB7, the controller 201 calculates the number of pages (hereinafter, referred to as "the number of corresponding pages") that correspond to at least one of the multiple printing modes by using the number of pages per combination tallied and then stored in the memory 202. The number of corresponding pages represents the number of pages each including an image formed on the sheet that has a higher quality than a predetermined quality in a case where printing is performed in a specific printing mode. For example, the controller 201 calculates the number of corresponding pages corresponding to the two-color printing mode in such a manner as to accumulate the numbers of pages per combination regarding combinations of two color regions. As another example, assume a case where combinations of three color regions have been stored in the memory 102. In this case, the controller 201 calculates the number of corresponding pages corresponding to the full-color printing mode in such a manner as to accumulate the numbers of pages per combination regarding combinations of three color regions. To calculate the number of corresponding pages corresponding to the black-and-white printing mode, the numbers of pages in which color region indicated by the extracted-color information is gray are accumulated. In the case where the number of corresponding pages corresponding to the black-and-white printing mode is calculated, each image forming apparatus 10 has stored therein the number of pages in which the color region indicated by the extracted-color information is gray, and the server apparatus 20 acquires the number of pages from the image forming apparatus 10. The controller 201 stores the calculated number of corresponding pages in the RAM.

In step SB8, the controller 201 compares the number of pages per mode with the number of corresponding pages. Specifically, the controller 201 calculates a difference between the number of pages per mode in the at least one of the multiple printing modes for which the number of corresponding pages is calculated in step SB7 and the number of corresponding pages in the printing mode. In step SB9, the controller 201 outputs information including a result of comparing the number of pages per mode with the number of corresponding pages. In a case where, for example, the number of corresponding pages corresponding to the two-color printing mode is larger than the number of pages per mode in the two-color printing mode, the controller 201 displays, on the display 204, a message suggesting the use of the two-color printing mode instead of the full-color printing mode. The controller 201 may also display, on the display 204, information indicating an amount of printing cost to be reduced in the case where the two-color printing mode is used instead of the full-color printing mode, the number of sheets to be reduced in the full-color printing, or the like.

In the processing described above, the server apparatus 20 tallies the number of pages per combination and outputs information obtained by using a tally result. A user of manager status of the information processing system 1 checks the information, and thereby printing cost reduction may be discussed, balance between printing quality and cost may be adjusted, and the like may be performed.

An exemplary embodiment of the present invention is not limited to the aforementioned exemplary embodiment, and various modifications may be made. Hereinafter, the modifications will be described. Two or more modifications to be described below may be combined with each other.

The first information processing apparatus is not limited to the image forming apparatuses 10. For example, computers connected to the image forming apparatuses 10 through a communication network may perform the processing illustrated in FIG. 6. In addition, the second information processing apparatus is not limited to the server apparatus 20. For example, one of the multiple image forming apparatuses 10 may tally the number of pages per combination and output information obtained by using a tally result. Further, each of the image forming apparatuses 10 may output information obtained by using the number of pages per combination recorded by itself.

The color models used by the image forming apparatus 10 are not limited to the RGB color model and the HSV color model. For example, a CMY color model or a CMYK color model may be used as a color model yet to be converted or having been converted. In another example, each image forming apparatus 10 may identify color regions corresponding to the respective RGB values in the RGB color model without converting the RGB color model.

The color model used for identifying color regions is not limited to the HSV color model. For example, another hue-based color model such as an HSL color model (color model composed of hue, saturation, and luminance) may be used for identifying the color regions.

The definition of color regions is not limited to the definition using values of the respective hue, saturation, and value components. The color regions may be defined by using a value of at least one of the hue, saturation, and value components. In addition, the color regions are not limited to those illustrated in the exemplary embodiment.

The combinations of color regions are not limited to those illustrated in FIG. 9. The combinations of color regions may also include three or more color regions.

The processing performed in the exemplary embodiment of the present invention is not limited to the processing illustrated in FIGS. 6 and 10. For example, in step SA2, the controller 101 may determine the appearance frequency of each RGB value in part of the image data. As a specific example, the controller 101 may determine the appearance frequency of the RGB value in such a manner as to remove pixels of the image of the data at predetermined intervals. As another example, in step SA3, the controller 101 may convert all the RGB values included in the frequency information into HSV values. In yet another example, the processing in step SA5 may be omitted. In this case, in step SA6, the controller 101 counts pages in which color regions indicated by the extracted-color information correspond to any one of the predetermined color-region combinations on a per color-region combination basis.

The information outputted by the server apparatus 20 is not limited to the information that includes the result of comparing the number of pages per mode with the number of corresponding pages. The server apparatus 20 may display on the display 204, for example, a result of tallying the number of pages per combination.

The hardware configurations of the apparatuses used in the information processing system 1 are not limited to the configurations illustrated in FIGS. 4 and 5. As long as the processing illustrated in FIGS. 6 and 10 is allowed to be performed, the apparatuses may have any hardware configuration.

In the exemplary embodiment, the recording program executed by the image forming apparatus 10 and the management program executed by the server apparatus 20 may be provided in such a manner as to be stored in a computer readable medium such as a magnetic storage medium, an optical storage medium, a magneto-optical storage medium, or a semiconductor memory such as a flash ROM. Examples of the magnetic storage medium include a magnetic tape and a magnetic disk such as a hard disk drive (HDD) or a flexible disk (FD). Examples of the optical storage medium include an optical disk such as a compact disk (CD) or a digital versatile disk (DVD). These programs may be downloaded through a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising at least one central processing unit (CPU) that:

- acquires image data including color values each of which denotes a color value of a corresponding one of a plurality of pixels;
- determines an appearance frequency of each color value in the acquired image data on a per page basis;
- identifies, from the color values, color regions to which pixels constituting at least part of the plurality of pixels belong, the color regions being in a color model;
- extracts color regions, on a per page basis, that account for a higher percentage of a page than a threshold percentage based on the appearance frequency of the color values;
- counts a number of pages in which the extracted color regions correspond to a color region combination; and
- transmits the number of pages corresponding to the color region combination.

2. The information processing apparatus according to claim 1, wherein the color model is a hue, saturation, value (HSV) color mode,

- the at least one CPU further converts the color values of the image data into color values of the HSV color model, and
- the at least one CPU identifies the color regions in the HSV color model.

3. The information processing apparatus according to claim 1, wherein the color region combination comprises a combination of two color regions.

4. The information processing apparatus according to claim 1, wherein the information processing apparatus selects a printing mode based on the number of pages of the color region combination, and forms an image on a sheet according to the selected printing mode.

5. An information processing system comprising:

- a first information processing apparatus and a second information processing apparatus, wherein
- the first information processing apparatus includes at least one central processing unit (CPU) that:
  - acquires image data including color values each of which denotes a corresponding one of a plurality of pixels, determines an appearance frequency of each color value in the acquired image data on a per page basis;

identifies, from the color values, color regions to which pixels constituting at least part of the plurality of pixels belong, the color regions being in a color model, extracts color regions, on a per page basis, that account for a higher percentage of a page than a threshold percentage based on the appearance frequency of the color values;

counts a number of pages in which the extracted color regions correspond to a color region combination; and transmits the number of pages to the second information processing apparatus, and the second information processing apparatus includes at least one central processing unit (CPU) that:

receives and records the number of pages, and outputs information obtained by using the recorded number of pages.

6. The information processing system according to claim 5, wherein the at least one CPU of the second information processing apparatus further:

acquires, in a plurality of printing modes in which a number of colors used in the printing modes is different for each printing mode, a number of pages printed in each of the plurality of printing modes, calculates a number of pages corresponding to at least one of the plurality of printing modes, by using the recorded number of pages, and outputs information including a result of comparing the acquired number of pages with the calculated number of pages.

7. The information processing apparatus according to claim 6, wherein the first information processing apparatus receives the output information, selects a printing mode based on the output information, and forms an image on a sheet according to the selected printing mode.

8. An information processing apparatus comprising at least one central processing unit (CPU) that:

acquires image data including color values each of which denotes a corresponding one of a plurality of pixels;

determines an appearance frequency of each color value in the acquired image data on a per page basis;

identifies, from the color values, color regions to which pixels constituting at least part of the plurality of pixels belong, the color values being in a color model;

extracts color regions, on a per page basis, that account for a higher percentage of a page than a threshold percentage based on the appearance frequency of the color values; and counts a number of pages in which the extracted color regions correspond to a color region combination.

* * * * *